Figure 1:
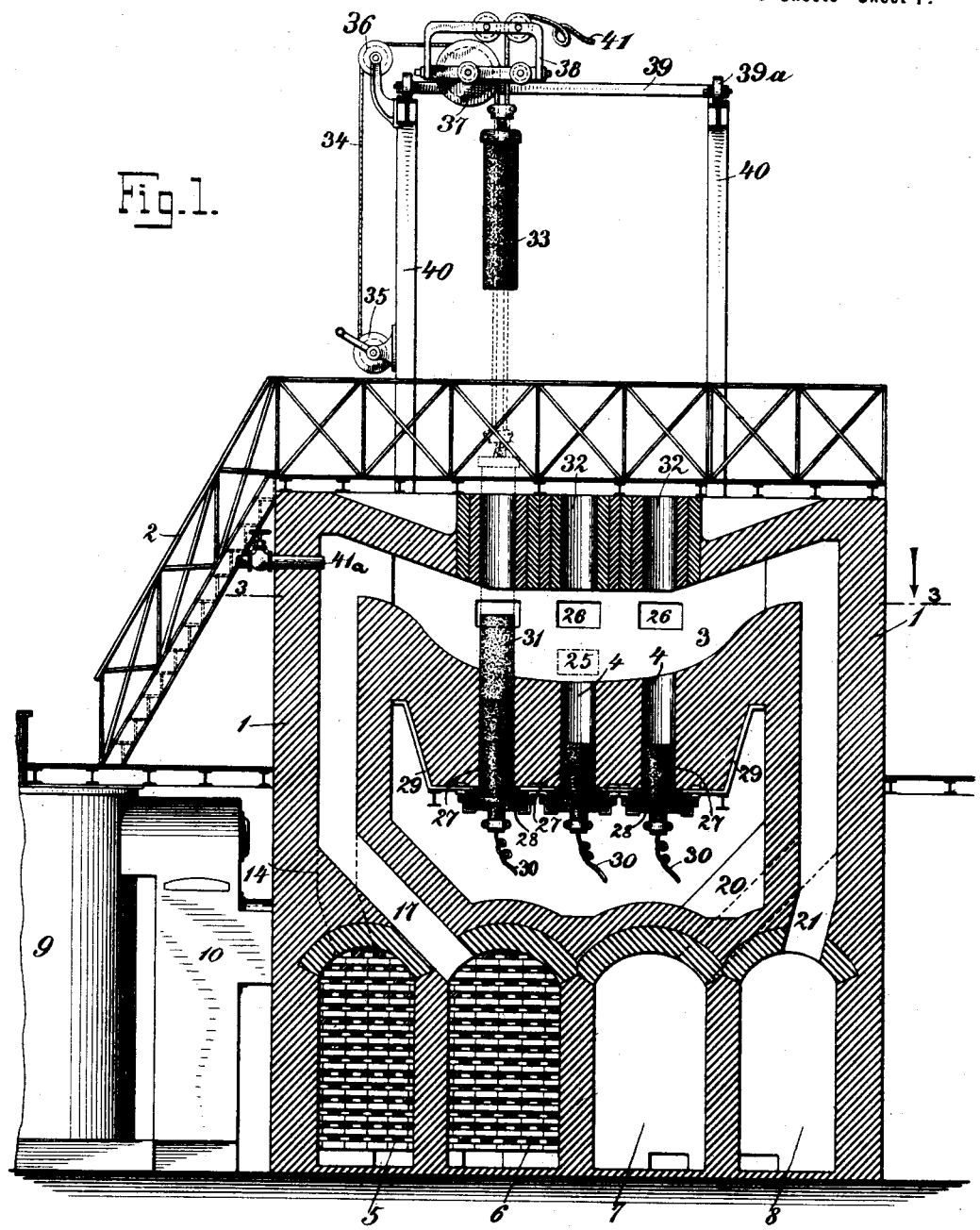

No. 609,864. Patented Aug. 30, 1898.
M. P. WOOD.
PROCESS OF AND APPARATUS FOR PRODUCING CALCIUM CARBID.
(Application filed Apr. 23, 1897. Renewed Jan. 27, 1898.)
(No Model.)

3 Sheets—Sheet 1.

WITNESSES:
Fr. N. Roehrich
J. E. Pearson

INVENTOR
Matthew P. Wood
BY
his ATTORNEY

THE MORRIS PETERS CO., PHOTO-LITHO., WASHINGTON, D. C.

No. 609,864. Patented Aug. 30, 1898.
M. P. WOOD.
PROCESS OF AND APPARATUS FOR PRODUCING CALCIUM CARBID.
(Application filed Apr. 23, 1897. Renewed Jan. 27, 1898.)
(No Model.) 3 Sheets—Sheet 2.
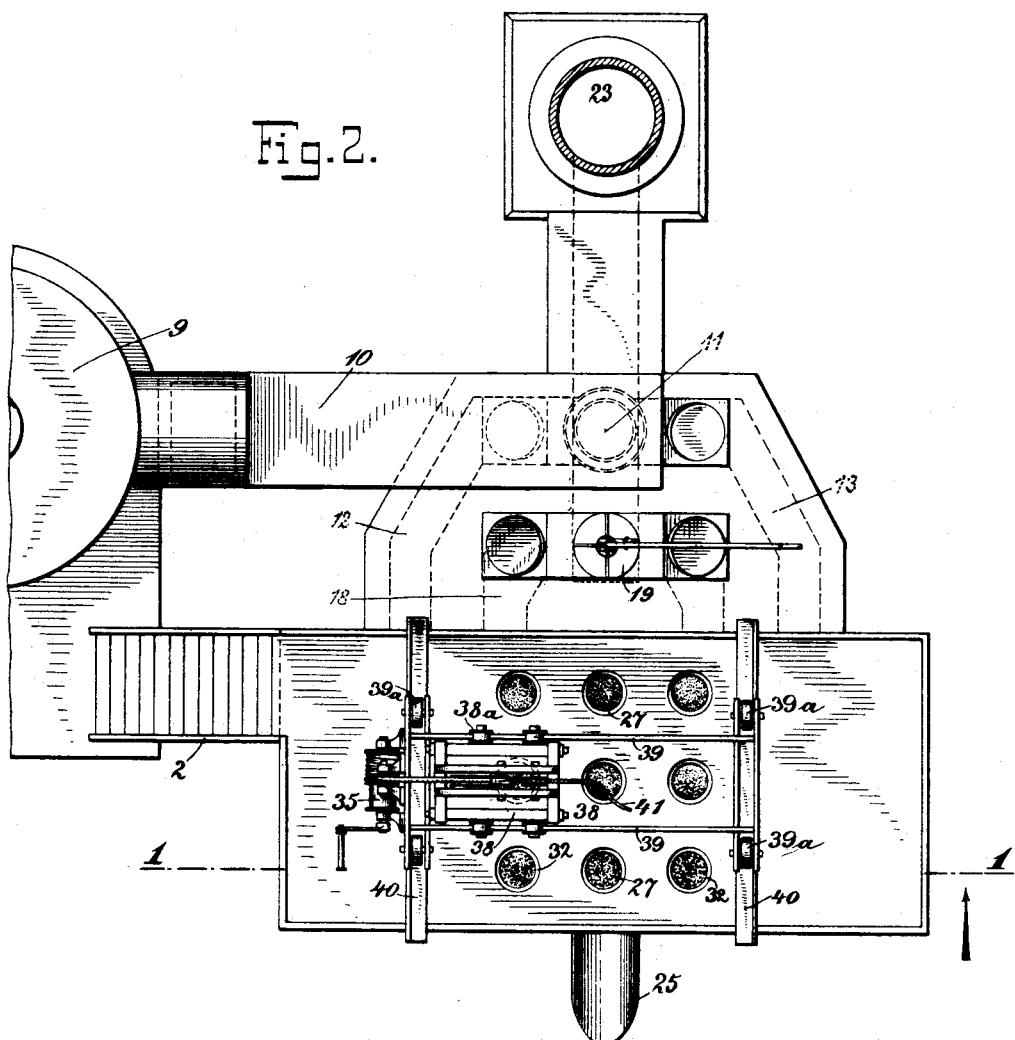
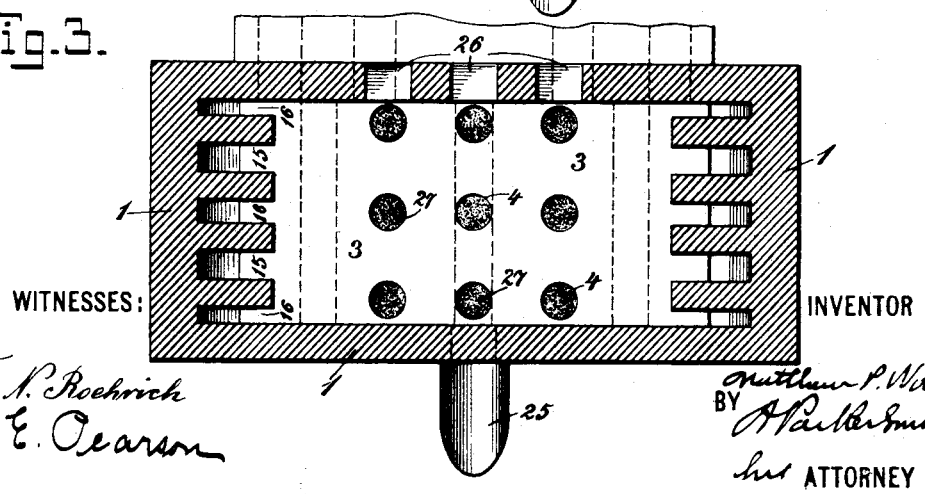
WITNESSES: INVENTOR
BY
ATTORNEY No. 609,864. Patented Aug. 30, 1898.
M. P. WOOD.
PROCESS OF AND APPARATUS FOR PRODUCING CALCIUM CARBID.
(Application filed Apr. 23, 1897. Renewed Jan. 27, 1898.)
(No Model.) 3 Sheets—Sheet 3.

WITNESSES:
Fr. N. Roehrich
J. E. Pearson

INVENTOR
Matthew P. Wood
BY
his ATTORNEY

UNITED STATES PATENT OFFICE.

MATTHEW P. WOOD, OF NEW YORK, N. Y.

PROCESS OF AND APPARATUS FOR PRODUCING CALCIUM CARBID.

SPECIFICATION forming part of Letters Patent No. 609,864, dated August 30, 1898.

Application filed April 23, 1897. Renewed January 27, 1898. Serial No. 668,230. (No model.)

*To all whom it may concern:*

Be it known that I, MATTHEW P. WOOD, a citizen of the United States, and a resident of the city, county, and State of New York, have invented a certain new and useful Process of and Apparatus for the Production of Calcium Carbid, particularly those relating to the formation of carbids such as the carbids of calcium ($CaC_2$) and strontium, ($SrC_2$,) all of which are decomposed or dehydrated by the simple addition of water, forming a hydrocarbon gas known as "acetylene," ($C_2H_2$,) useful for many purposes in the arts synthetically, and particularly so when used as an illuminating or fuel gas, either alone or in combination with air or with other hydrocarbon gases of a different or composite character for the purpose of producing heat, power, or light, of which the following is a specification.

The formation of this group of carbid compounds, and especially that of the carbid of calcium, ($CaC_2$,) to which my process and apparatus are particularly adaptable, has heretofore only been possible experimentally by the use of the intense heat of the electric arc generated by a Bunsen or other battery or by the use of the modern dynamo, the electric current thus generated in a properly-arranged electric furnace yielding a heat of approximately 5,500° to 6,300° Fahrenheit. Between these degrees the fusion of the carbid materials takes place according to the following reaction:

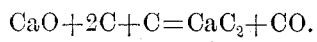
$$CaO + 2C + C = CaC_2 + CO.$$

It has been demonstrated that electrolysis has no effect whatever in the reduction, which is one purely of heat action. Both alternating and direct currents have been employed with amperes of varying amounts, the reduction being effected readily with a voltage as low as one, provided sufficient amperes were supplied.

The modern dynamo used for electric-furnace and reduction work supplies a current of too high potential to be safely or satisfactorily used, and it is carried through a step-down transformer that reduces it to any required tension and ampere amount, for the production of carbid of calcium a voltage of sixty to one hundred with one thousand to two thousand amperes being used. Ordinarily one net electrical horse-power at the furnace-electrodes produces from ten and one-half to twelve and one-half pounds of carbid of calcium per twenty-four-hour day, working continuously, the carbid yielding from 4.7 to five cubic feet of acetylene ($C_2H_2$) gas per pound of carbid, or from forty-four to fifty-three cubic feet of moist gas per net electrical horse-power used at the furnace, from two hundred and twenty-five to two hundred and fifty net electrical horse power being employed for this duty, requiring from three hundred to three hundred and fifty prime motive power; or, in other words, three to four horse power or prime motor are required to produce one pound of calcic carbid per hour under general conditions of electric-furnace work.

The process and apparatus ordinarily employed in the production of calcic carbid may be briefly described. A cast-iron plate from two to four feet in diameter and two or more inches thick furnishes the foundation upon or around which the furnace is built. Provision is made in this plate for a suitable connection with the minus-wire from a battery or dynamo. Upon this iron plate carbon plates or bricks of any convenient size and thickness are laid and cemented together with pitch, bitumen, or other compounds, and then covered with a layer of hard coke in small pieces, the whole forming the cathode of the furnace.

The wall of the furnace is usually about two and a half feet square in plan inside and of any convenient thickness and height, through the roof of which an opening is left to pass the carbon-pencil or electrode, which is built up of carbon plates or rods usually eight inches by twelve, or twelve inches square, in section, and suitably connected with the positive or + wire from the dynamo and forms the anode of the furnace. This anode is made adjustable in its position in the furnace over the cathode by suitable connections in the dynamo-room and is governed by the electrical expert from the readings of the instruments of precision usually employed to determine the voltage and amperes of electric currents. This control of the electric current by the expert is wholly independent of the employees at the furnace, whose duty is solely to feed the furnace with the carbid materials properly prepared for use and in such definite quantities and at such periods as the working of the furnace indicates as necessary.

The operation of the above-described electric furnace in the production of carbid of calcium is in general, viz: The furnace being empty and the electrodes being in position and contact, the electric current is turned on and an electric arc formed between the electrodes, which are then slightly separated and a quantity of carbid material shoveled into the furnace around the anode. The conductivity of this material is low, resistance to the passage of the current is at once apparent, and an intense heat is generated that fuses the carbid materials into a carbid of calcium, ($CaC_2$,) the surplus carbon in the carbid material combining with the oxygen of the quicklime and escaping from the furnace as carbonic-oxid gas. The anode is then raised slightly and another charge of material added and the operation repeated as often as desired, the mass of carbid being built up, as it were, by successive charges of the material, which fuses and becomes partially cooled until the mass is proximately some two and a half feet in height, when the short circuit of the electric current through the fused and partially-fused mass and the unacted-upon carbid material surrounding the mass becomes so great that the further operation of the furnace becomes, if not impossible, so uncertain and wasteful as to render a stoppage necessary. The electric current is therefore cut off and the mass of carbid allowed to cool down for a number of hours and is then removed in mass and used as desired. Notwithstanding the apparently favorable conditions for a perfect fusion of the whole amount of carbid materials placed in the furnace for reduction and the excess of carbon allowed to effect this reduction, the carbid mass is found to contain a notable per cent. of free lime and carbon, that not only is a detriment to the carbid as an impurity so far as its gas-generating qualities are concerned to form acetylene gas, ($C_2H_2$,) but it increases the tendency of the carbid to hydrate from atmospheric influences beyond that attendant upon the pure carbid itself, which needs to be guarded against as soon as the carbid is cold. The loss of carbid material applied to the furnace and the amount of carbid produced ranges from thirty-three to fifty per cent., and up to the present hour all attempts to make the electric furnace a practical continuous operation have proven failures by reason of the short circuit of current, uncertainty of reduction, and the sluggish nature of the fused carbid, that will not allow it to flow away from the zone of fusion to the tap-hole of the furnace without chilling to a pasty mass and stopping up the tap or draw hole.

My invention relates to the reduction of refractory mineral and earthy compounds by the use of a high temperature applied directly to the material to be reduced, which is contained in the vessel or chamber, in which the heat is generated either by producer or other gaseous fuel, solid fuel in form of coke or coal, or both combined, aided or supplemented at the latter stage of the reduction operation by the energy of the electric arc, if desired.

The Siemens regenerative furnace is the type generally used in the arts to obtain the temperature necessary for metallurgical operations, which seldom exceed 4,000° Fahrenheit, as in the case of melting steel or in blast-furnaces for the making of pig cast-iron. It is a modification of this Siemens furnace and an improvement of it that form the nature of my invention and that enable me to obtain temperatures approximating the dissociation-point of carbonic-acid gas, ($CO_2$,) which is supposed to be about 5,000° Fahrenheit, and even beyond this point to that of the heat of the electric arc, commonly given at 6,300° Fahrenheit, and at the same time to so control the operation of the furnace that whatever heat is being evolved therein it may be of an oxidizing or non-oxidizing character, at will.

The preferred form of apparatus for carrying out my invention is illustrated in the accompanying three sheets of drawings, in which—

Figure 4:
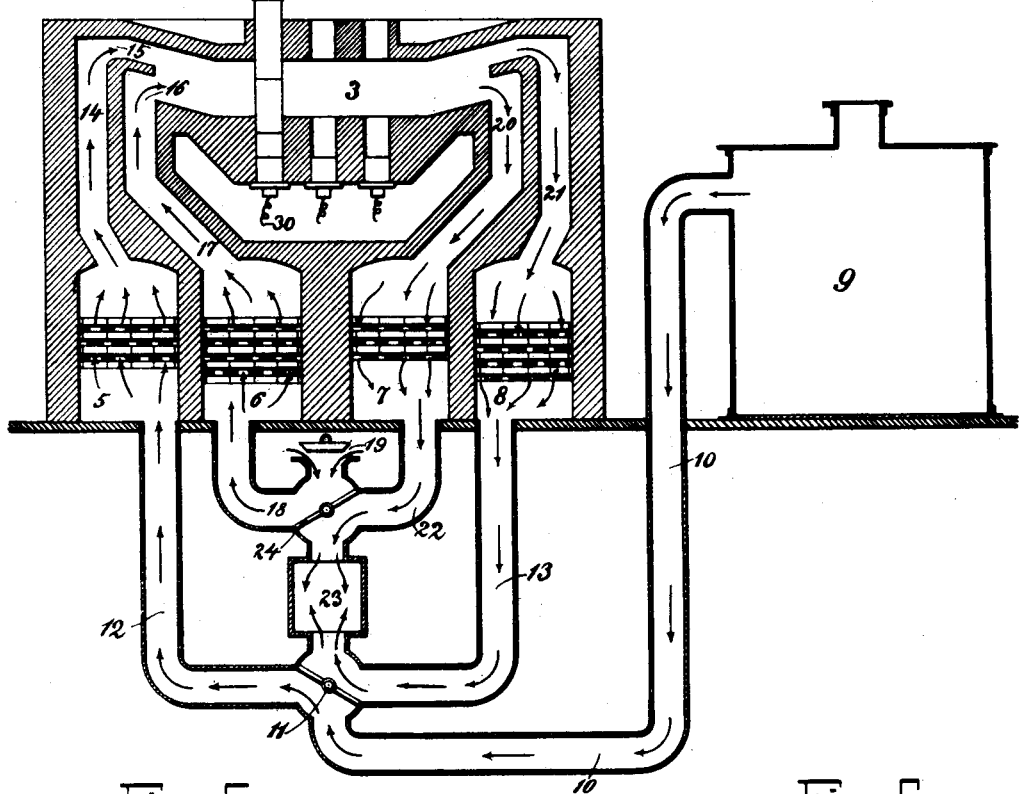
Figure 5:
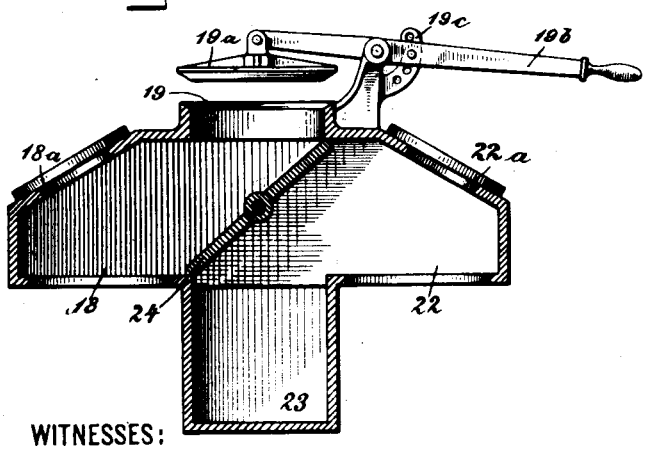
Figure 6:
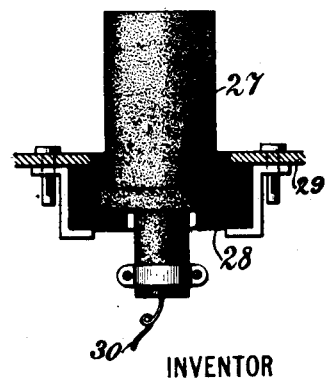

Figure 1 is a vertical section on line 1 1 of Fig. 2 of an improved form of furnace. Fig. 2 is a plan view of the same. Fig. 3 is a horizontal section through the hearth of the furnace on line 3 3 of Fig. 1. Fig. 4 is a diagrammatic view showing the air and gas passages through my furnace. Fig. 5 is a detail showing the air-inlet valve, and Fig. 6 is a detail showing the way in which the cathode is insulated from the pan of the furnace.

Throughout the drawings like reference-figures refer to like parts.

1 represents the walls of the furnace, and 2 is a stairway and gallery affording access to the top of said furnace.

3 is the hearth of the furnace, in which are formed any convenient number of holes 4 4. In the foundation of the furnace are a number of chambers filled with checker-work of the well-known form shown at 5 6 7 8.

9 represents any gas-producer or other source of fuel-gas supply, and 10 is a conduit through which the gas is transmitted to the furnace. This has branches 12 and 13, controlled by the valve 11 or other suitable arrangement.

14 represents a passage-way from the hearth of the furnace to one of the checker-work chambers 5, and 15 is the opening of said passage-way to the hearth.

16 is a similar opening of passage-way 17, which extends to the checker-work chamber 6. 18 is a conduit connecting this checker-work chamber with the open air, said opening being controlled by the valve 19, which consists of the cover 19$^a$, supported on a hand-lever 19$^b$ and adjustable by means of a pin passing through the series of holes 19°. Of course any other suitable apparatus for constituting and regulating the opening can be substituted.

20 and 21 are similar passage-ways from the hearth of the furnace on the other side to the checker-work chambers 7 and 8, respectively.

24 is a valve throwing either of the passage-ways 18 and 22 into connection with the air-inlet 19.

23 represents the stack through which the waste gases are discharged.

25 indicates a spout through which the contents of the furnace-hearth may be discharged, and 26 a series of inspection-ports or peep-holes.

27 is a cathode made of carbon fitting into any one of the holes 4 in the hearth of the furnace. This is insulated from the metal pan 29 of the hearth by the insulation 28.

30 represents any electrical connection.

31 represents a cylinder or prism of pulverized carbon and the refractory compound which is to be reduced in the furnace. 32 32 represents a series of holes in the roof of the furnace registering with the holes 4 4 in the hearth thereof. 33 is a movable anode of carbon which fits into these holes 32. This movable anode is preferably mounted on some kind of a traveling crane.

I have illustrated a rope or chain 34, which can be wound on a windlass 35, mounted on the frame 40, said rope passing over pulley 36 and pulley 37, which latter is mounted in a traveling carriage 38. This carriage has transverse motion along guides 39 of a second carriage, which has longitudinal motion along the main frame 40 by means of the rollers 39ª.

41 is a flexible electrical connection to the anode.

Such being the construction of the preferred form of furnace, the operation of the same in carrying out my invention is as follows: The refractory mineral compound to be reduced is formed by pulverizing graphite or other form of carbon and the lime or other base and mixing the same into a cartridge, such as is shown at 31. A binding agent, composed of coal-tar, pitch, resin, asphaltum, molasses, sugar, or other kindred substances, is mixed with the carbon and lime or other substance to form the cartridge to be reduced. From one to three per cent., by weight, of the cartridge of these binding materials is found sufficient to enable the cartridge to be readily molded in an ordinary pug-mill usually employed in tile and brick making. The carbon in these binding materials replaces an equal amount of the dry-carbon element in the make-up of the cartridge material and vaporizes as readily and effectively as the dry carbon. A series of these are then placed in the holes 4 4 in the hearth of the furnace, and the furnace is put in operation in the manner usual in regenerative furnaces.

If the valves are arranged in the position shown in Fig. 4, the fuel-gas passes through the conduit 12, through the heated checker-work in the chamber 5, up through the passage-way 14, and out at the port 15, there being a series of such ports, as shown in Fig. 3. The air is drawn in through the opening 19, passes through the conduit 18, the hot checker-work of chamber 6, passage-way 17, and out at the ports 16, mingling with the gas and producing intense combustion in the hearth 3 of the furnace and around the cartridges 31.

The hot gases of combustion pass out through the passage-ways 20 and 21 and checker-work chambers 7 8, heating the checker-work therein, then on through the passage-ways 22 13 to the stack 23.

When the checker-work chambers 7 8 are raised to the proper degree of heat, the action of the furnace is reversed by reversing the valves 24 11. Thus a continuous regenerative action is attained.

When the cartridges to be reduced have been raised to the highest temperature possible from this action of the combustion-furnace, the anode 33 is lowered through one of the holes 32 upon one of said cartridges and electric current of the necessary volume and power passed through it. A short application of the current will suffice to complete the fusion of the cartridge, causing it to run down to the hearth and be retained in a liquid form by the intense heat. The anode 33 is then withdrawn, a new cartridge inserted through that hole, and the anode is moved over and dropped through the next hole 32 to repeat the operation on the next cartridge.

At proper intervals the molten material in the hearth is drawn off through the spout 26. If lime and carbon are used to form the cartridges, it is evident that the production of fluid carbid of calcium will result, which can be drawn off and cast into any desired form.

Various changes in the arrangement of the apparatus of my invention could be made so long as a powerful regenerative furnace were obtained in which the cartridges of refractory mineral compound could be raised to the highest heat possible to be produced from combustion and then a current of electricity passed through said cartridges without removing them from the furnace.

41ª shows a pipe through which hydrocarbons may be introduced to the combustion-chamber of the furnace for the purpose of rendering the flame oxidizing or non-oxidizing at the will of the operator.

The fusion of the material from the top of the cartridge and progressively downward is an important feature of my process, such resulting from the method of operating the furnace above described. It is directly contrary to the method of procedure in nearly all other carbid-furnaces, in which the fusion begins at the bottom and proceeds upward. The action of the carbid anode upon the column of highly-heated material causes streams of molten carbid to course down the column, cutting it as it runs and rendering fusion of the lower portions easier and more rapid.

Having therefore described my invention, what I claim as new, and desire to protect by Letters Patent, is—

1. The process of reducing refractory mineral compounds, which consists of the following steps: first, forming a mixture of the pulverized mineral and carbon with a suitable binder into a cartridge; second, subjecting said cartridge to the direct heat of a combustion-furnace; third, passing an electric current through the cartridge while still subjected to the heat of said furnace, substantially as described.

2. The process of reducing refractory mineral compounds which consists in the following steps: first, forming a mixture of the pulverized mineral and carbon with a suitable binder into cartridges; second, subjecting a number of said cartridges to the highest heat of a combustion-furnace; third, passing an electric current through each of said cartridges successively until it is melted down; fourth, replacing each cartridge when melted down by a new one, whereby the process is rendered continuous, substantially as described.

3. The combined combustion and electrical furnace which has a hearth with a series of holes therein, suitable ports for the admission of combustible gas and air a carbon cathode in the bottom of each hole and insulated from the pan thereof, a series of holes in the roof of the furnace registering with those in the hearth, a traveling crane, and a carbon anode supported therefrom, capable of being lowered into any one of the holes in the roof, a flexible electrical conductor connected with said anode, and electrical connections to the cathodes, substantially as described.

4. The combined combustion and electrical furnace which has a hearth with a series of holes therein suitable ports for the admission of combustible gas and air a carbon cathode in the bottom of each hole and insulated from the pan thereof, a series of holes in the roof of the furnace registering with those in the hearth, a traveling crane, and a carbon anode supported therefrom, capable of being lowered into any one of the holes in the roof, a flexible electrical conductor connected with said anode, and electrical connections to the cathodes, together with a hollow foundation for said hearth, and removable fastenings for said cathodes underneath the pan of the furnace, projecting into said hollow space, whereby access thereto may be had, substantially as described.

5. The process of reducing refractory mineral compounds, which consists of the following steps: first, forming a mixture of the pulverized mineral and carbon with a suitable binder into a cartridge; second, subjecting said cartridge to the heat of the combustion-furnace; third, passing an electric current through the cartridge while in a vertical position still subjected to the heat of said furnace, the initial contact and fusion occurring at the top of said cartridge, substantially as described.

In testimony whereof I affix my signature in presence of two witnesses.

MATTHEW P. WOOD.

Witnesses:
ARTHUR E. BLATZ,
A. PARKER SMITH.